United States Patent
Shang et al.

(10) Patent No.: US 7,457,860 B2
(45) Date of Patent: Nov. 25, 2008

(54) NODE LOCALIZATION IN COMMUNICATION NETWORKS

(75) Inventors: Yi Shang, Columbia, MO (US); Wheeler Ruml, Palo Alto, CA (US)

(73) Assignee: Palo Alto Research Center, Incorporated, Palo Alto, CA (US)

( * ) Notice: Subject to any disclaimer, the term of this patent is extended or adjusted under 35 U.S.C. 154(b) by 1265 days.

(21) Appl. No.: 10/682,754

(22) Filed: Oct. 9, 2003

(65) Prior Publication Data
US 2005/0080924 A1   Apr. 14, 2005

(51) Int. Cl.
G06F 15/16 (2006.01)
G06F 15/177 (2006.01)

(52) U.S. Cl. .................. 709/223; 709/238; 715/734

(58) Field of Classification Search ................ 709/224, 709/226, 238, 239, 242, 223; 702/150, 186; 455/456.1–6; 715/734
See application file for complete search history.

(56) References Cited

U.S. PATENT DOCUMENTS

| | | | | |
|---|---|---|---|---|
| 5,386,507 | A * | 1/1995 | Teig et al. | 715/836 |
| 6,941,246 | B2 * | 9/2005 | Raykar et al. | 702/186 |
| 7,123,925 | B2 * | 10/2006 | Robinson et al. | 455/456.1 |
| 2002/0177476 | A1 | 11/2002 | Chou | 455/574 |
| 2004/0203380 | A1 * | 10/2004 | Hamdi et al. | 455/41.2 |

OTHER PUBLICATIONS

S. Capkun, M. Hamdi, J.P. Hubaux, GPS-free positioning in mobile Ad-Hoc networks, in 34th Hawaii Int'l Conf. On System Sciences (HICSS-34), Maui, Hawaii, Jan. 2001, pp. 3481-3490.
L. Doherty, K. Pister, L. El Ghaoui, Convex Position Estimation in Wireless Sensor Networks, in Proc. Infocom 2001, Anchorage, AK, Apr. 2001, pp. 1655-1663.
A. Howard, M.J. Mataric, G.S. Sukhatme, Relaxation on a Mesh: a Formalism for Generalized Location, in Proc. IEEE/RSJ Int'l Conf. On Intelligent Robots and Systems (IROS01), 2001, pp. 1055-1060.
A. Nasipuri, K. Li, A Directionality based Location Discovery Scheme for Wireless Sensor Networks, in 1st ACM Int'l Workshop on Wireless Sensor Networks and Applications (WSNA'02), Atlanta, GA, Sep. 2002, pp. 105-111.
D. Niculescu, B. Nath, Ad Hoc Positioning System (APS), in IEEE GlobeCom, Nov. 2001, pp. 2926-2931.
S.I. Roumeliotis, G.A. Bekey, Synergetic Localization for Groups of Mobile Robots, in Proc. 39th IEEE Conf. On Decision and Control, Sydney, Australia, Dec. 2000, pp. 3477-3482.

(Continued)

*Primary Examiner*—Paul H Kang
(74) *Attorney, Agent, or Firm*—Oliff & Berridge, PLC

(57) ABSTRACT

Disclosed herein is a method for deriving node localization information within communication networks having a plurality of nodes, which are separated by node paths. The method includes estimating the shortest path between multiple pairs of nodes in the network and constructing a matrix encompassing the estimated shortest paths. Multidimensional scaling is then applied to the matrix and the largest eigenvectors of the transformed matrix are identified. From this is constructed a relative map of the location of the pairs of nodes within the network by utilization of the eigenvectors.

27 Claims, 6 Drawing Sheets

OTHER PUBLICATIONS

C. Savarese, J. Rabaey, J. Beutel, Locationing in Distributed Ad-Hoc Wireless Sensor Networks, in IEEE Int'l Conf. On Acoustics, Speech, and Signal Processing (ICASSP), Salt Lake City, UT, May 2001, pp. 2037-2040.

C. Savarese, J. Rabaey, K. Langendoen, Robust Positioning Algorithms For Distributed Ad-Hoc Wireless Sensor Networks, in USENIX Technical Annual Conf., Monterey, CA, Jun. 2002, pp. 317-327.

A. Savvides, C. Han, M. B. Strivastava, Dynamic Fine-Grained Localization In Ad Hoc Networks of Sensors, in ACM/IEEE Int'l Conf. On Mobile Computing and Networking (MOBICON), Jul. 2001, pp. 166-179.

A. Savvides, H. Park, M.B. Srivastava, The Bits And Flops of the N-hop Multilateration Primitive For Node Localization Problems, in 1st ACM Int'l Workshop on Wireless Sensor Networks and Applications (SSNA'02), Atlanta, GA, Sep. 2002, pp. 112-121.

\* cited by examiner

NODE LOCALIZATION IN COMMUNICATION NETWORKS

This work was funded in part by the Defense Advanced Research Projects Agency (DARPA), Contract #F33615-01-C-1904. The U.S. Government may have certain rights in this invention.

BACKGROUND

This disclosure relates generally to the field of networked electronic devices, and more particularly to methods for determining the positions of nodes in a communications network.

For example, a network of sensors may be sprinkled across a large building or an area such as a forest. Typical tasks for such networks are to send a message to a node at a given location (without knowing which node or nodes are there, or how to get there), to retrieve sensor data (e.g., sound or temperature levels) from nodes in a given region, and to find nodes with sensor data in a given range. Most of these tasks require knowing the positions of the nodes, or at least relative positions among them. With a network of thousands of nodes, it is unlikely that the position of each node has been predetermined. Nodes could be equipped with a global positioning system (GPS) to provide them with absolute position, but this is a costly solution.

Among existing localization methods for communications networks, one approach, suggested by L. Doherty et al., "Convex Position Estimation in Wireless Sensor Networks", in *Proc. Infocom* 2001, Anchorage, Ak., April 2001, is based on connectivity only. This convex constraint satisfaction approach describes a method for localizing sensor nodes based only on connectivity. The method formulates the localization problem as a feasibility problem with convex radial constraints. The problem is in turn solved by efficient semidefinite programming (an interior point method) to find a global solution. For the case with directional communication, the method formulates the localization problem as a linear programming problem, which is solved by an interior point method. This method requires centralized computation. For the method to work well, it needs 'anchor nodes', whose positions are already known, to be placed on the outer boundary, preferably at the corners. Only in this configuration are the constraints tight enough to yield a useful configuration. When all anchors are located in the interior of the network, the position estimation of outer nodes can easily collapse toward the center, which leads to large estimation errors. For example, with 10% anchors, the error of unknowns is on the order of the radio range. With 5 anchors in a 200-node random network, the error of unknowns is more than twice the radio range.

Most localization methods for ad-hoc networks require more information than just connectivity and use more powerful beacon nodes. The ad-hoc localization techniques used in mobile robots usually fall into this category and are described in A. Howard, et al., "Relaxation on a Mesh: A Formalism for Generalized Localization", in *Proc. IEEE/RSJ Int'l Conf. On Intelligent Robots and Systems* (IROS-01), pages 1055-1060, 2001. Mobile robots use additional odometric measurements for estimating the initial robot positions, which are not available in sensor networks.

Many existing localization techniques for networks use distance or angle measurements from a fixed set of reference points or anchor nodes and apply multilateration or triangulation techniques to find coordinates of unknown nodes, as in A. Nasipuri and K. Li, "A Directionality Based Location Discovery Scheme for Wireless Sensor Networks", in $1^{st}$ *ACM Int'l Workshop on Wireless Sensor Networks and Applications* (WSNA '02), pages 105-111, Atlanta, Ga., September 2002. The distance estimates can be obtained from received signal strength (RSSI) or time-of-arrival (ToA) measurements. Due to non-uniform signal propagation environments, RSSI methods are not very reliable and accurate. ToA methods have better accuracy, but may require additional hardware at the nodes to receive a signal that has a smaller propagation speed than radio, such as ultrasound (A. Savvides, et al., "Dynamic fine-grained Localization in Ad Hoc Networks of Sensors", in *ACM/IEEE Int'l Conf. On Mobile Computing and Networking* (MOBICON), July 2001). Emphasis has been placed on algorithms that can be executed in a distributed fashion on the nodes without centralized computation, communication, or information propagation. The "DV-based" approach suggested by D. Niculescu and B., "Ad-hoc Positioning System", in *IEEE GlobeCom*, November 2001, is distributed. The "DV-hop" method achieves a location error of about 45% of the radio range for networks with 100 nodes, 5 anchors, and average connectivity 7.6. Initially, anchor nodes flood their location to all nodes in the network. Each unknown node performs a triangulation to three or more anchors to estimate its own position. This method works well in dense and regular topologies, but for sparse and irregular networks, the accuracy degrades to the radio range. The "DVdistance" method uses distance between neighboring nodes and reduces the location error by about half of that of "DV-hop".

Savarese et al. propose another distributed method in "Robust Positioning Algorithm for Distributed Ad-hoc Wireless Sensor Networks", in *USENIX Technical Annual Conf.*, Monterey, Calif., June 2002. The method consists of start-up and refinement phases. For the start-up phase, Hop-TERRAIN, an algorithm similar to DV-hop, is utilized. Hop-TERRAIN, which requires at least three initial anchor nodes, is run once at the beginning to generate a rough initial estimate of the nodes' locations. Then the refinement algorithm is run iteratively to improve and refine the position estimates. The algorithm is concerned only with nodes within a one-hop neighborhood and uses a least-squares triangulation method to determine a node's position based on its neighbors' positions and distances to them. The approach can deliver localization accuracy within one third of the communication range.

When the number of anchor nodes is high, the collaborative multilateration approach by Savvides et al., "The bits and Flops of the n-hop Multilateration Primitive for Node Localization Problems", in $1^{st}$ *ACM Int'l Workshop on Wireless Sensor Networks and Applications* (WSNA '02), pages 112-121, Atlanta, Ga., September 2002, has been suggested. This approach estimates node locations by using anchor locations that are several hops away and distance measurements to neighboring nodes. A global nonlinear optimization problem is then solved. The method has three main phases: 1) formation of a collaborative subtree, which only includes nodes whose positions can be uniquely determined; 2) computation of initial estimates with respect to anchor nodes; and 3) position refinement by minimizing the residuals between the measured distances between the nodes and the distances computed using the node location estimates. They present both a centralized computation model and a distributed approximation of the centralized model. The method works well when the fraction of anchor nodes is high.

Most of the existing methods require anchor or beacon nodes to begin the process. It would be advantageous to have a system and approach which does not have this limitation and can construct a relative map of the network nodes even without anchor nodes, while maintaining estimation accuracy.

BRIEF SUMMARY

The disclosed embodiments provide examples of improved solutions to the problems noted in the above Background discussion and the art cited therein. There is shown in these examples an improved method, which may provide some or all of the following features. The method described herein derives node localization information within communication networks having a plurality of nodes, which are separated by node paths. The method includes estimating the shortest path between multiple pairs of nodes in the network and constructing a matrix encompassing the estimated shortest paths. Multidimensional scaling is then applied to the matrix and the largest eigenvectors of the transformed matrix are identified. From this is constructed a relative map of the location of the pairs of nodes within the network by utilization of the eigenvectors.

Another example disclosed herein is an article of manufacture in the form of a computer usable medium having computer readable program code embodied in the medium. When the program code is executed by the computer, the computer performs method steps for deriving node localization information within communication networks having a plurality of nodes separated by paths. The method includes estimating the shortest path between multiple pairs of nodes in the network and constructing a matrix encompassing the estimated shortest paths. Multidimensional scaling is then applied to the matrix and the largest eigenvectors of the transformed matrix are identified. From this is constructed a relative map of the location of the pairs of nodes within the network by utilization of the eigenvectors.

BRIEF DESCRIPTION OF THE DRAWINGS

The foregoing and other features of the embodiments described herein will be apparent and easily understood from a further reading of the specification, claims and by reference to the accompanying drawings in which:

DETAILED DESCRIPTION

Figure 1:
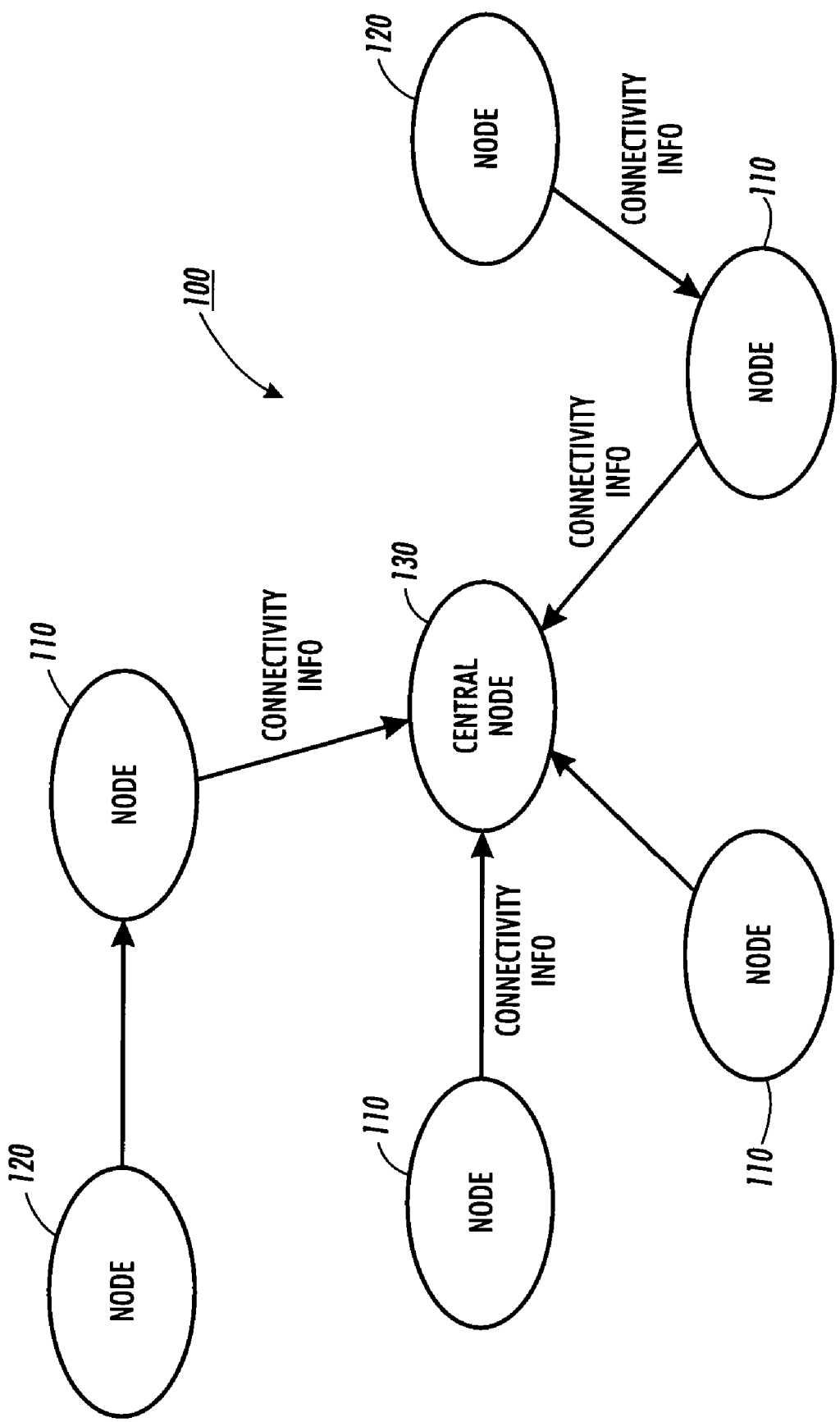
FIG. 1 is a simplified diagram of an example centralized network.

Developed herein are a method and system utilizing connectivity information (which nodes are within communications range of which other nodes) to derive the positions of nodes in large-scale networks. Although these nodes can communicate with one another, not every node knows its precise location, either in absolute geographical coordinates or in terms relative to other nodes in the network. This method and system may take advantage of additional information, such as estimated distances between neighbors or known positions for certain anchor nodes, if it is available. The method is based on multidimensional scaling (MDS) techniques, which compute coordinates of objects from given distances or dissimilarities between them to construct embeddings of the objects in a metric space. In the disclosed system, the computed embeddings correspond to relative maps of the network nodes. An optional refinement step may be utilized to improve the relative maps found by MDS. Absolute coordinates of nodes may be developed utilizing linear transformations (translation, reflection, orthogonal rotation, and scaling) of a relative map.

For the purposes of node localization, there are two types of nodal relationships, both of which are based on local information. One relationship is the proximity (or connectivity) information, in which each node knows only which nodes are nearby (by means of a local communication or sensing channel, such as radio or sound), but not the distance to or direction for reaching the neighboring node. The other relationship expands the proximity information by knowing distances, perhaps with limited accuracy, between neighboring nodes.

In both cases, the network is represented as a graph with vertices V and edges E, such that the vertices correspond to nodes. Of the $n=|V|$ nodes, there exist $m \geq 0$ nodes with known positions, which are defined as anchors for the purposes herein. For the proximity-only case, the edges correspond to the connectivity information. For the case with known distances to neighbors, the edges are associated with values corresponding to the estimated distances.

The two possible outputs when solving the localization problem are a relative map and an absolute map. The task in developing a relative map involves building a map of the nodes (either on a two-dimensional plane or in a three- or higher-dimensional space) that has the same network structure as the underlying network, without necessarily determining the absolute coordinates of the nodes. This is useful when there are insufficient anchors to uniquely determine the absolute positions of the nodes. It also is useful with applications that only require relative positions of nodes, such as in some direction-based routing algorithms. The task of finding an absolute map is to locate the absolute coordinates of all nodes, which may be required by many applications such as geographic routing and target discovering and tracking.

As will be shown, the method herein may generate either result depending on the number of anchor nodes. The method first generates a relative map of the network and then transforms it to absolute positions if sufficient anchors are available. Before proceeding with descriptions of the various embodiments of the method and system disclosed herein, a brief description of MDS is provided as a basis for the discussion.

MDS is a set of data analysis techniques that display the structure of distance-like data as a geometrical picture. Beginning with one or more distance matrices (or similarity matrices) of points in a multidimensional space, MDS finds a geometrical placement of the points in a low-dimensional space, usually 2-D or 3-D, where the distances between points resemble their original similarities. Various types of MDS techniques exist and can be classified according to whether the similarity data is qualitative ('nonmetric' or 'ordinal' MDS) or quantitative ('metric' MDS). They can also be classified according to the number of similarity matrices and the nature of the MDS model. While there are numerous varieties of MDS, for the purposes of brevity in this discussion, classical metric MDS is used because it uses a single distance matrix, provides an analytical solution via singular value decomposition that requires no iterative optimization, and outputs simple point estimates. However those knowledgeable in the art will appreciate that many other forms of MDS may be utilized with the method and system and their use is fully contemplated by the scope of the specification and claims herein.

In classical metric MDS, the data is quantitative and the proximities of objects are treated as distances in a Euclidean space. The goal of metric MDS is to find a configuration of points in a multidimensional space such that the inter-point distances are related to the provided proximities by some transformation (e.g., a linear transformation). If the proximity data are generated from points in a Euclidian space, then classical metric MDS can exactly recreate the configuration of points. Otherwise, classical MDS finds the least squared error solution. Solutions can be obtained for varying numbers of desired coordinate dimensions. For example, for a two-dimensional network, the first two largest eigenvalues and eigenvectors are used to construct the best 2-D approximation. For a three-dimensional network, the first 3 largest eigenvalues and eigenvectors are used to construct the best 3-D approximation.

Turning now to FIG. 1, a simplified diagram illustrates an example of a centralized network 100 with multiple nodes. Central node 130 may include computing means for gathering information from each of the nodes and performing the operations associated with a centralized embodiment of the method herein. Nodes 110 are immediate neighbor nodes to central node 130 and are defined as being one hop away from the central node. Nodes 120 are neighbors to selected nodes 110 and are defined as being two hops away from the central node 130. Other nodes at greater than two hops away from the central node may also exist on the network. For the purposes of the method herein, there is no inherent limitation on the number of neighbor nodes or the number of nodes at greater than one hop away from the central node.

Figure 2:
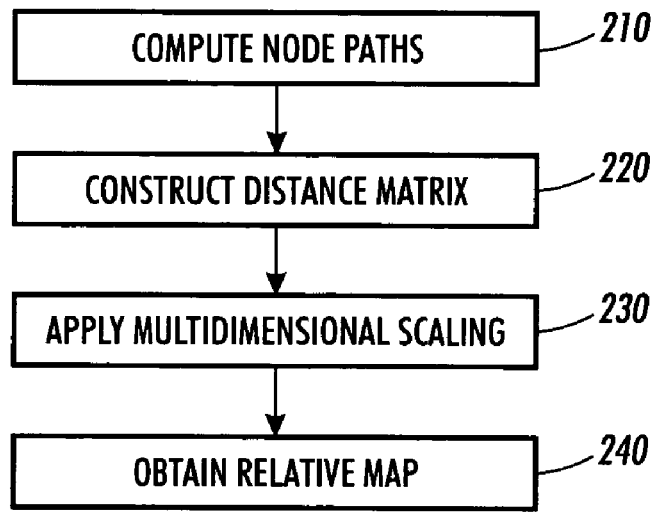
FIG. 2 is a simplified flow diagram illustrating one embodiment of the method for a centralized application.

In FIG. 2, a simplified flow diagram illustrates a first embodiment of the method herein. In this centralized embodiment of the method, the components of the method are computed using global information of a given network. Beginning with available network connectivity information, a shortest-paths algorithm roughly estimates the distance between each possible pair of nodes. Then MDS is employed to derive node locations that fit those estimated distances. The solution of MDS forms a relative map of the nodes. Optionally, least squares minimization may be applied to modify the coordinates of the nodes such that the distances between nearby nodes better fit the measured hops (or distances). Finally, the resulting coordinates are transformed to take into account any nodes whose positions are known.

At 210, the shortest paths between all pairs of nodes in a region of consideration are computed. This process is initialized with the information that is known about the network. When only proximity information is available, a small value such as "1" may be assigned to all edges between neighboring nodes. When the distance of a pair of neighbor nodes is known, the corresponding edge has a value of the measured distance. While for the purposes of describing the embodiments disclosed herein a path is described as being a distance, this is by means of example only. It will be appreciated that a path between nodes could also be expressed as a number of hops, amount of radio power, or some other abstract measure, all of which are contemplated by the specification and scope of the claims herein. At that point an all-pair shortest-path algorithm, such as Dijkstra's or Floyd's algorithm, can be applied. While for the purposes of simplicity in this discussion an all-pairs shortest-path algorithm has been applied, one skilled in the art will appreciate that other approaches could be beneficially applied, all of which are contemplated by the specification and scope of the claims herein. The complexity of such methods is typically not more than $O(n^3)$, where n is the number of nodes. If desired, pair-wise distances may be computed between all nodes in the network, although only a subset of the pair-wise distances need be computed. From this information, a distance matrix is constructed at 220.

MDS is applied directly to the distance matrix at 230. For those instances when there are missing entries in the distance matrix, variants of classical MDS can be applied. The first two (or three) largest eigenvalues and eigenvectors are retained to construct a two-dimensional (or three-dimensional) relative map at 240. For the purposes of this discussion, relative maps are constructed irrespective of anchor nodes. For those instances in which anchor nodes are present, using their positions in constructing the relative map may improve the accuracy of the maps, and such an approach is fully contemplated by the specification and scope of the claims herein.

Figure 3:
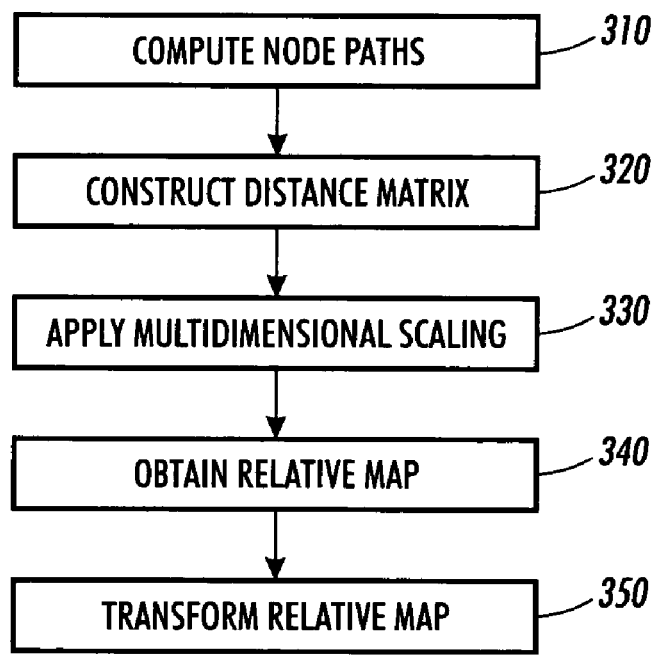
FIG. 3 is a simplified flow diagram illustrating another embodiment of the method for a centralized application.

Turning now to FIG. 3, a simplified flow diagram illustrates another embodiment of the centralized version of the method. In this centralized embodiment of the method, the components of the method are computed using global information of a given network. Beginning with available network connectivity information, a shortest-paths algorithm roughly estimates the distance between each possible pair of nodes. Then MDS is employed to derive node locations that fit those estimated distances. The solution of MDS forms a relative map of the nodes. Optionally, least squares minimization may be applied to modify the coordinates of the nodes such that the distances between nearby nodes fit the measured hops (or distances). Finally, the resulting coordinates are transformed to take into account any nodes whose positions are known.

At 310, the shortest paths between all pairs of nodes in a region of consideration are computed. Initially values are assigned to the edges. When only proximity information is available, a value of "1" may be assigned to all edges. When the distance of a pair of neighbor nodes is known, the corresponding edge has a value of the measured distance. At that point an all-pair shortest-path algorithm, such as Dijkstra's or Floyd's algorithm, can be applied. While for the purposes of simplicity in this discussion an all-pairs shortest-path algorithm has been applied, one skilled in the art will appreciate that other approaches could be beneficially applied, all of which are contemplated by the specification and scope of the claims herein. The complexity of such methods is typically no more than $O(n^3)$, where n is the number of nodes. If desired, pair-wise distances may be computed between all nodes in the network, although only a subset of the pair-wise distances need be computed. From this information, a distance matrix is constructed at 320.

MDS is applied directly to the distance matrix at 330. For those instances when there are missing entries in the distance matrix, variants of classical MDS can be applied. The first two (or three) largest eigenvalues and eigenvectors are retained to construct a two-dimensional (or three-dimensional) relative map at 340. For the purposes of this discussion, relative maps are constructed irrespective of anchor nodes. For those instances in which anchor nodes are present, using their positions in constructing the relative map may improve the accuracy of the maps, and such an approach is fully contemplated by the specification and scope of the claims herein.

At 350, the relative map is transformed from a relative map to an absolute map through linear transformations, which may include translation, reflection, orthogonal rotation, and scaling. The goal is to minimize the sum of squares of the errors between the true positions of the anchors and their transformed positions in the MDS map. Computing the transformation parameters via least-squares fitting takes $O(m^2)$, where m is the number of anchors. The suggested number of anchor nodes is three or more for a two-dimensional map, or four or more for a three-dimensional map. Applying the transformation to the whole relative map is a complexity of $O(n)$. The node coordinates are thus defined.

Figure 4:
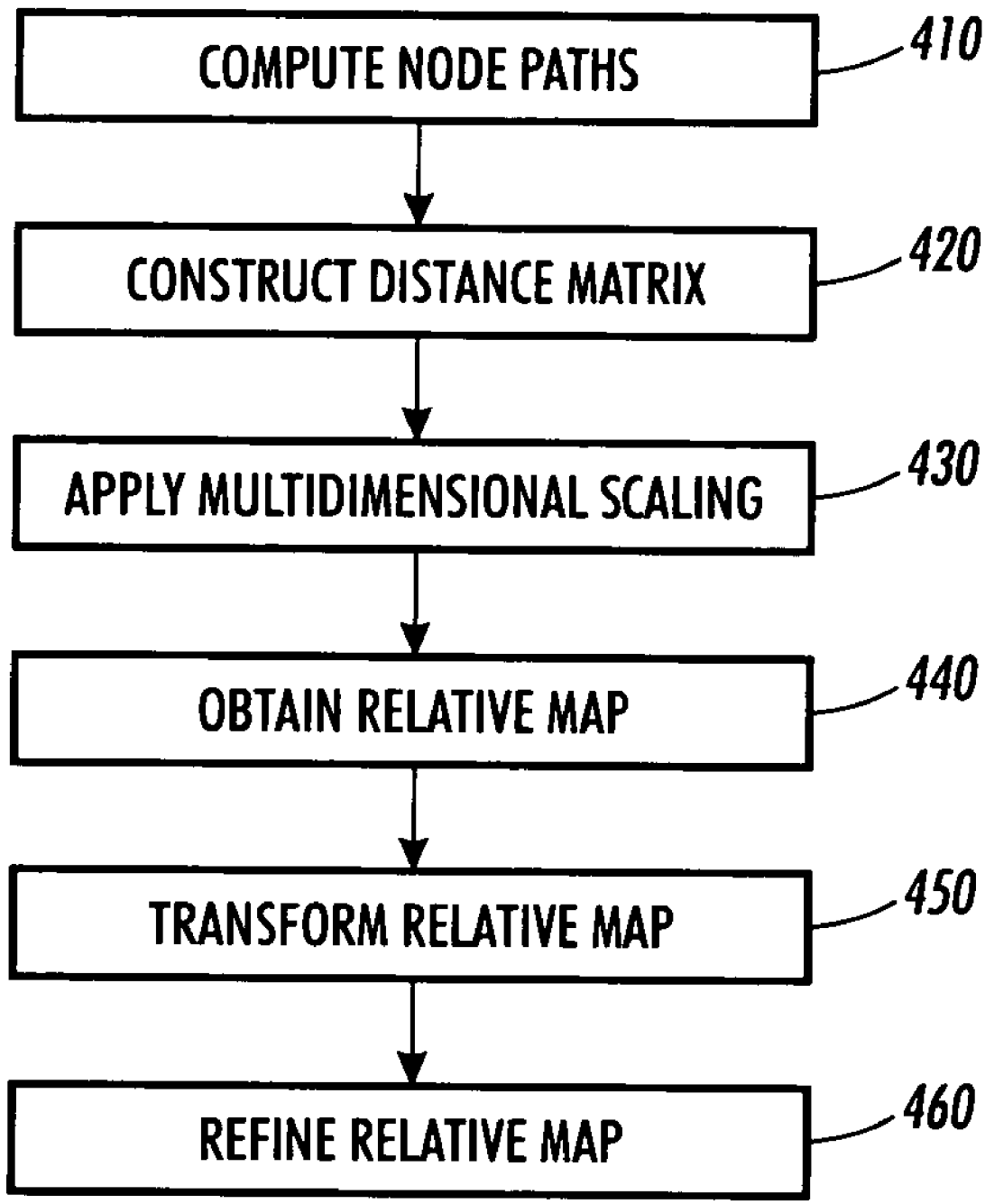
FIG. 4 is a simplified flow diagram illustrating a third embodiment of the method for a centralized application.

Turning now to FIG. 4, a simplified flow diagram illustrates another embodiment of the centralized version of the method. At 410, the shortest paths between all pairs of nodes in a region of consideration are computed. Initially values are assigned to the edges. When only proximity information is available, a value of "1" may be assigned to all edges. When the distance of a pair of neighbor nodes is known, the corresponding edge has a value of the measured distance. Other information such as constraints from ranging data may also be used to refine the distance matrix. At that point a classical all-pair shortest-path algorithm, such as Dijkstra's or Floyd's algorithm, can be applied. While for the purposes of simplicity in this discussion an all-pairs shortest-path algorithm has been applied, one skilled in the art will appreciate that other approaches could be beneficially applied, all of which are contemplated by the specification and scope of the claims herein. The complexity is $O(n^3)$, where n is the number of nodes. If desired, pair-wise distances may be computed between all nodes in the network. From this information, a distance matrix is constructed at 420.

MDS is applied directly to the distance matrix at 430. For those instances when there are missing entries in the distance matrix, variants of classical MDS can be applied. The first two (or three) largest eigenvalues and eigenvectors are retained to construct a two-dimensional (or three-dimensional) relative map at 440. For the purposes of this discussion, relative maps are constructed irrespective of anchor nodes. For those instances in which anchor nodes are present, using their positions in constructing the relative map may improve the accuracy of the maps, and such an approach is fully contemplated by the specification and scope of the claims herein.

At 450, the relative map is transformed from a relative map to an absolute map through linear transformations, which may include translation, reflection, orthogonal rotation, and scaling. The goal is to minimize the sum of squares of the errors between the true positions of the anchors and their transformed positions in the MDS map. Computing the transformation parameters takes $O(m^2)$, where m is the number of anchors. The preferred number of anchor nodes is three or more for a two-dimensional map, or four or more for a three-dimensional map. Applying the transformation to the whole relative map is a complexity of $O(n)$. The node coordinates are thus defined.

The distance map, or matrix, is refined at 460. Because MDS uses shortest path distances to approximate the true distance between nodes, the approximation may not be as accurate as desired for nodes several hops away. In the refinement step, the goal is to obtain more accurate positions using distance information between close-by nodes, which is more accurate than that between distant nodes.

Using the position estimates of nodes in the MDS solution as the initial point, least squares minimization (for example, the Levenberg-Marquardt method), or any other known approach, may be applied to solve the nonlinear least-squares problem, to cause the distances between nodes in a refinement range $R_{ref}$ match the estimated (or measured) ones. For a 2-D n-node network, the problem has 2n variables and no constraints.

As in the construction of the distance matrix, further information can be used during this refinement step to improve the distances, including but not limited to directional information and possibly imprecise anchor node locations. The exact objective function used during refinement not only includes information between 1-hop neighbors, but also some information between multi-hop neighbors, although these distances are weighted less. The refinement range $R_{ref}$ specifies what distances are considered and is defined based on hops. $R_{ref}=1$ means only the distances to the direct (one-hop) neighbors of a node are considered; $R_{ref}=2$ means the distances to the neighbors within 2 hops of a node are considered, and so on. When the method uses only proximity information, nodes one hop away have a distance value of 1 and nodes two hops away have a distance value of 2. When distance measures between one-hop neighbors are available, the distances to two-hop neighbors are the shortest paths.

The best value of $R_{ref}$ may be a compromise between computation and solution quality. A smaller value of $R_{ref}$ reduces the time required for the least squares minimization computation, but the solution quality may be affected due to lack of sufficient information. The best value of $R_{ref}$ also depends on the connectivity of the network.

Figure 5:
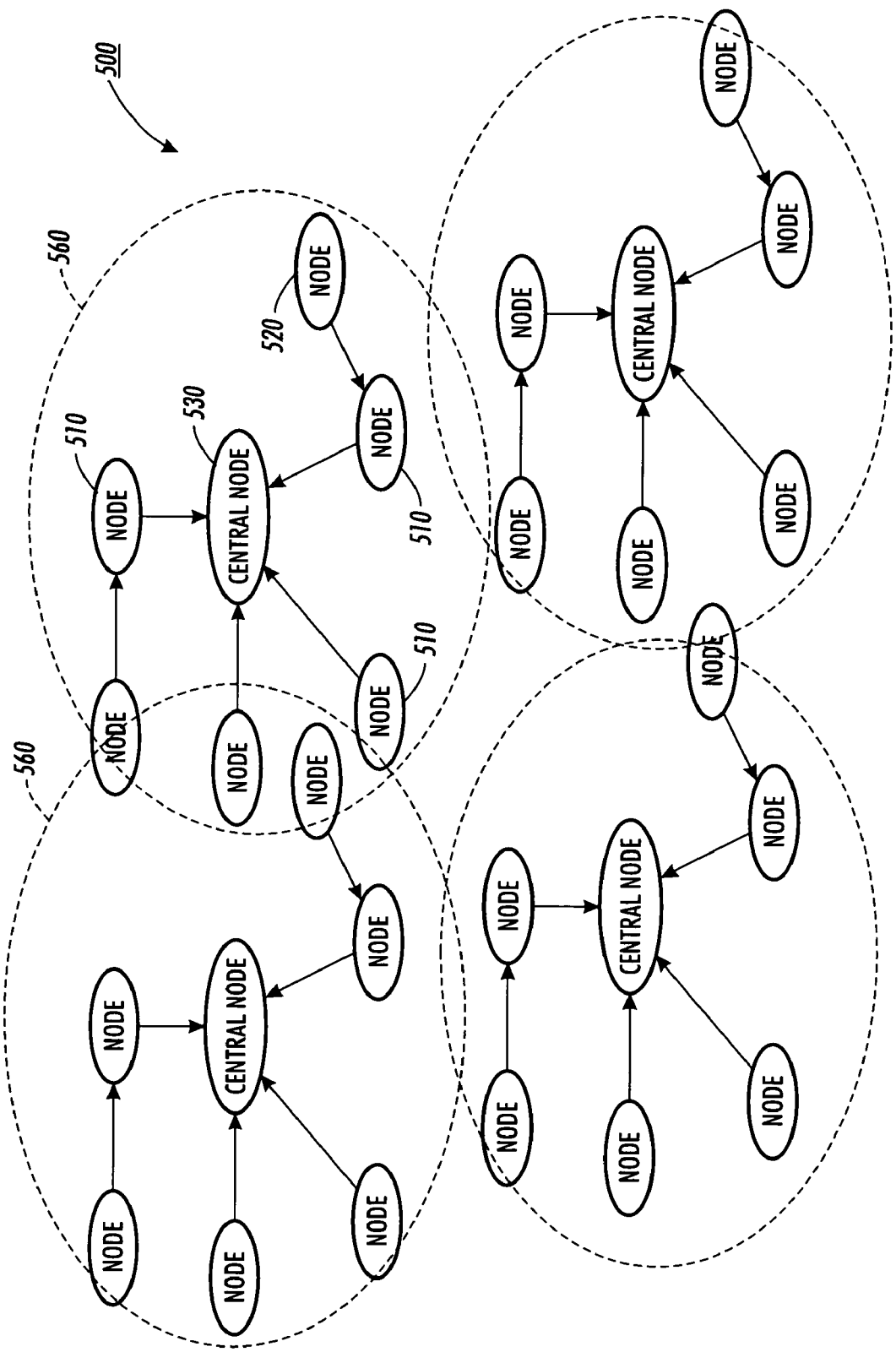
FIG. 5 is a simplified diagram of an example distributed network.

For a network with thousands or millions of nodes, centralized computation may not be sufficient. Such a network is illustrated in a simplified form in FIG. 5, in which distributed network 500 includes a plurality of sub-networks 560, each containing a central node 530, neighbor nodes 510 which are within one hop of the central node, and additional nodes 520 within two or more hops from the central node 530. Although for the purposes of this illustration all the sub-networks are shown as being identical, it will readily be appreciated that the sub-networks could vary in size, composition, overlap, and configuration. Additionally, the number of sub-networks could vary from two sub-networks to any desired number of sub-networks.

A centralized embodiment may not scale well with a large number of nodes, but may be used as a baseline in assessing the performance of a distributed embodiment. In the distributed embodiment of the method, local maps are constructed at multiple nodes, using distance information for nodes in each node's neighborhood. Local maps may be constructed at every node or only at some desired subset of nodes. The initial part of the technique at each node is similar to the centralized embodiments in that MDS may be followed by local refinement. There are then two alternatives for using the local maps. One alternative is to construct a global map of the network by patching the local maps together based on the common nodes of two maps. The resulting global map could then be transformed based on the anchor nodes' coordinates and thus the absolute coordinates of all nodes can be determined. The other alternative is to compute the transformations between the coordinate systems of neighboring nodes. Using these transformations and the coordinates of three or more anchor nodes, the coordinate of each node can be independently determined.

Figure 6:
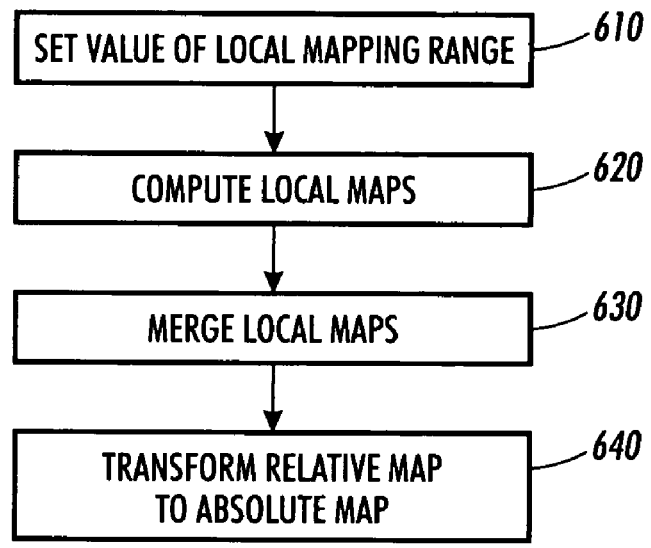
FIG. 6 is a simplified flow diagram illustrating one embodiment of the method for a distributed application.

Turning now to FIG. 6, a flow diagram illustrates a distributed embodiment of the method for node localization. At 610 the value of the local mapping range, $R_{lm}$, is set. For each node, neighbor nodes within $R_{lm}$ hops are considered in constructing its local map. The value of $R_{lm}$ affects the amount of computation in building the local maps, as well as the quality of the maps, and should be adaptive to the connectivity of the neighborhood. In a sparse region, a larger value of $R_{lm}$ may be beneficial, whereas in a dense region, a smaller value may be beneficial. For brevity, in the discussion of this embodiment the value of $R_{lm}$ is fixed for the entire network, however, it will be understood that the use of variable $R_{lm}$ is fully contemplated by the specification and scope of the claims herein. At 620, the local maps for the individual nodes are computed, as is discussed more fully with reference to FIG. 7.

At 630, the local maps are merged, either sequentially or in parallel, which may be accomplished by any known merging method, all of which are fully contemplated by the specification and scope of the claims herein. Depending on the merging method used, maps may be merged in different orders such as randomly or according to certain properties, such as, for example, order of maximum similarity or overlap with the current map. While there are various ways of merging local maps sequentially, such as randomly or according to a certain order most applicable for a particular application, one possible approach is through patching. In this approach a randomly selected node and its local map are made the core map. Then the core map is grown by merging the maps of neighboring nodes to the core map. The neighbor's map with the maximal number of common nodes with the core map is selected for each patch. Eventually the core map covers the entire network. If the merges are chosen carefully, the complexity of this step is $O(k^3 n)$, where k is the average number of neighbors and n is the number of nodes.

For example, in merging local maps, an incremental greedy algorithm may be utilized. Let $LN(p)=\{q|q$ is within $R_{lm}$ hops from $p\}$ represent the set of nodes in p's neighborhood; and LM (p) represent the local map of node p, which contains the coordinates of nodes in LN(p). A node p is randomly selected, and then set $C=\{p\}$, $D=LN(p)$, and $M=LM(p)$. The following steps are iterated until C contains all nodes.
1) Find $p' \in D-C$ such that the number of common nodes in D and $LN(p')$ is the largest.
2) Merge M and LM (p'). Set $C=C \cup \{p'\}$, $D=D \cup LN(p')$, and $M=merge(M,LM(p'))$.

Two local maps are combined by minimizing the conformation difference of their common nodes subject to the best linear transformation, instead of a rigid mapping, which provides more resilience to errors.

For each local map M, two lists of nodes are maintained, OPEN(M) and CLOSED(M). Nodes in CLOSED(M) have been considered, i.e., their local maps have been merged into M. The local maps of nodes in OPEN(M) are neighbors of those in CLOSED(M), but their local maps have not been merged. For a node p,
CLOSED(LM(p))={p}
OPEN(LM(p)=LN(p)-{p}.

The actual merging of two maps M and M' is then accomplished through computation of the intersection I=(CLOSED (M)∪OPEN(M))∩(CLOSED(M')∪OPEN(M')).

At 640 a linear transformation T of the nodes in I from their coordinates in M to those in M' is determined, such that the sum of squared errors between M and T(M') is minimized. There may be two options for T. One includes translation, reflection, and orthogonal rotation. The other includes scaling as well. M and related data are then updated through setting
OPEN(M)=(OPEN(M)∪OPEN(M'))−(CLOSED(M) ∪CLOSED(M'))
CLOSED(M)=CLOSED(M)∪CLOSED(M').

To obtain the coordinates of a node p in the new combined map M,
If p is in the old M but not in M', the coordinates in M are used;
If p is in M' but not in the old m, the coordinate in T(M') is used;
Otherwise, the average of p's coordinates in the old M and T(M') are used.

For the purposes of this discussion, relative maps are constructed irrespective of anchor nodes. For those instances in which anchor nodes are present, using their positions in constructing the relative map may improve the accuracy of the maps, and such an approach is fully contemplated by the specification and scope of the claims herein. If sufficient anchor nodes are known (three or more for two-dimensional networks, four or more for three-dimensional networks), at 640 the relative map is transformed to an absolute map based on the absolute positions of anchors. For r anchor nodes, the complexity of this step is $O(r^3+n)$.

Figure 7:
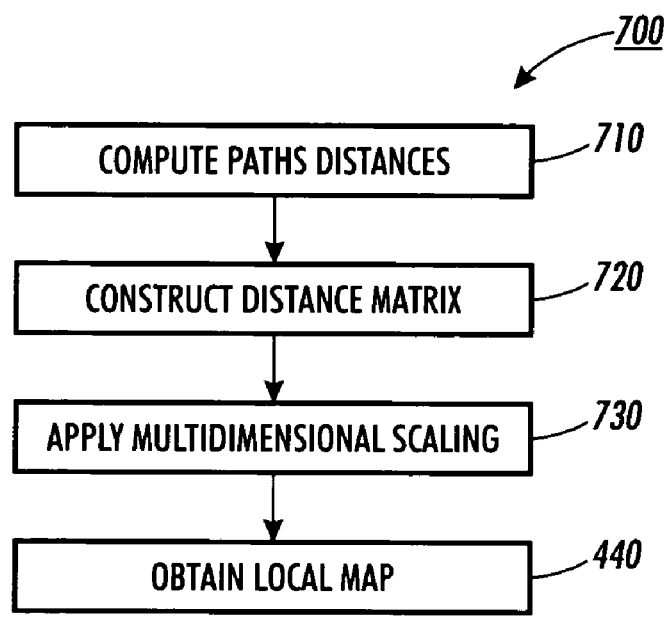
FIG. 7 is a simplified flow diagram illustrating computation of local maps.

Turning now to FIG. 7, computation of local maps for the individual nodes is illustrated more fully. For each node in the network, the shortest paths between all pairs of nodes in a node's local mapping range $R_{lm}$ is computed at 710. The shortest path distances are used to construct the distance matrix at 720. MDS is applied to the distance matrix at 730 and the first 2 (or 3) largest eigenvalues and eigenvectors are retained to construct a two-dimensional (or three-dimensional) local map at 740.

Figure 8:
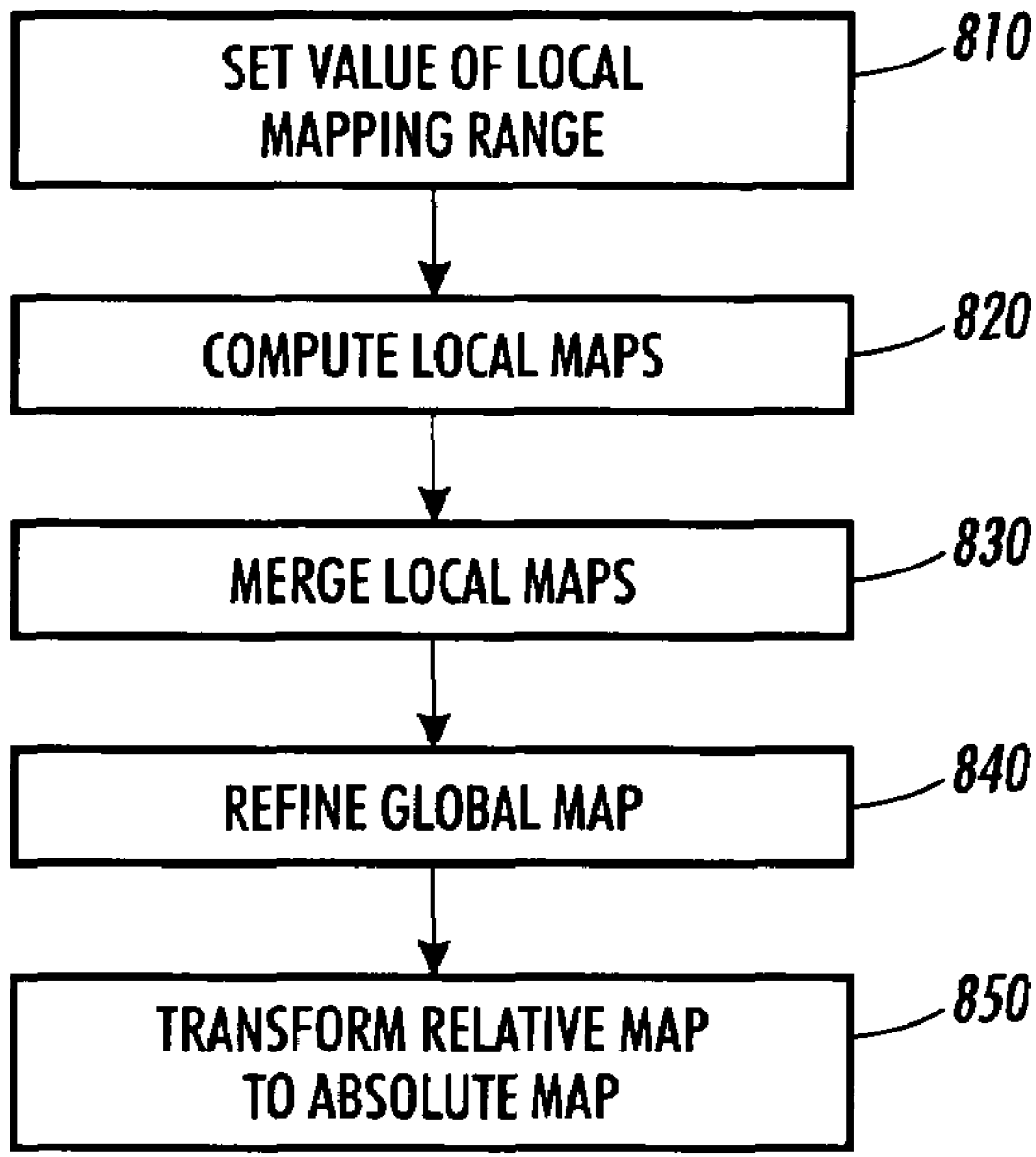
FIG. 8 is a simplified flow diagram illustrating another embodiment of the method for a distributed application.

Turning now to FIG. 8, another embodiment of the distributed method is illustrated in a flow diagram. At 810 the value of the local mapping range, $R_{lm}$, is set. For each node, neighbor nodes within $R_{lm}$ hops are considered in constructing its local map. The value of $R_{lm}$ affects the amount of computation in building the local maps, as well as the quality of the maps, and can be adaptive to the connectivity of the neighborhood. In a sparse region, a larger value of $R_{lm}$ may be beneficial, whereas in a dense region, a smaller value may be beneficial. For brevity, in the discussion of this embodiment the value of $R_{lm}$ is fixed for the entire network, however, it will be understood that the use of variable $R_{lm}$ is fully contemplated by the specification and scope of the claims herein. At 820, the local maps for the individual nodes are computed, as was discussed more fully with reference to FIG. 7, hereinabove.

At 830, the local maps are merged together, which may be accomplished by any known merging method, all of which are contemplated by the specification and scope of the claims herein. Depending on the merging method used, maps may be merged in different orders such as randomly or according to certain properties. While there are various ways of merging local maps sequentially, such as randomly or according to a certain order most applicable for a particular application, one possible approach is through patching. In this approach a randomly selected node and its local map are made the core map. Then the core map is grown by merging the maps of neighboring nodes to the core map. The neighbor's map with the maximal number of common nodes with the core map is selected for each patch. Eventually the core map covers the entire network. If the merges are chosen carefully, the complexity of this step is $O(k^3 n)$, where k is the average number of neighbors and n is the number of nodes.

For example, in merging local maps, an incremental greedy algorithm may be utilized. Let $LN(p)=\{q|q$ is within $R_{lm}$ hops from $p\}$ represent the set of nodes in p's neighborhood; and LM (p) represent the local map of node p, which contains the coordinates of nodes in LN (p). A node p is randomly selected, and then set $C=\{p\}$, $D=LN(p)$, and $M=LM(p)$. The following steps are iterated until C contains all nodes.
3) Find $p' \in D-C$ such that the number of common nodes in D and $LN(p')$ is the largest.
4) Merge M and $LM(p')$. Set $C=C \cup \{p'\}$, $D=D \cup LN(p')$, and $M=merge(M,LM(p'))$.

Two local maps are combined by minimizing the conformation difference of their common nodes subject to the best linear transformation, instead of a rigid mapping, which provides more resilience to errors. For each local map M, two lists of nodes are maintained, OPEN(M) and CLOSED(M). Nodes in CLOSED(M) have been considered, i.e.; their local maps have been merged into M. The local maps of nodes in OPEN(M) are neighbors of those in CLOSED(M), but their local maps have not been merged. For a node p, CLOSED(LM(p))={p}
OPEN(LM(p)=LN(p)-{p}.

The actual merging of two maps M and M' is then accomplished through computation of the intersection I=(CLOSED(M)∪OPEN(M))∩(CLOSED(M')∪OPEN(M')).

The resulting global map is refined at 840 to further improve it before transforming it based on anchor nodes. (The map may also be refined at any intermediate stage if so desired.) Using the node coordinates in the global map as the initial solution, least squares minimization, or any other suitable approach, may be applied to cause the estimated distances between neighboring nodes to match the measured distances. The exact objective function used during refinement not only includes information between 1-hop neighbors, but also some information between multi-hop neighbors, although these distances are weighted less. A refinement range $R_{ref}$, defined in terms of hops, to specify what information is considered. $R_{ref}=1$ means only distances between immediate neighbors are considered; $R_{ref}=2$ means distances to all nodes within two hops are considered; and so on. Different values of $R_{ref}$ may be utilized to balance computational cost and solution quality.

For example, $(x_i, y_i)$, $i=1, \ldots, N$ represents the coordinates of the N nodes in a local map; $d_{ij}=\sqrt{(x_i-x_j)^2+(y_i-y_j)^2}$ is the Euclidean distance between two nodes i and j; and $p_{ij}$ is the proximity of nodes i and j. When only connectivity information is available, $P_{ij}=1$ if i and j are 1-hop neighbors, $P_{ij}=2$ if i and j are 2 hops apart, and so on. When distance measures between 1-hop neighbors are available, $p_{ij}$ is the distance measure between i and j if they are 1-hop neighbors, and $p_{ij}$ is the shortest path distance if i and j are more than 1 hop away. The objective of the refinement step is as follows;

$$\min_{x_k, y_k} \sum_{i,j,i\neq j} w_{ij}(d_{ij} - p_{ij})^2, \text{ for } k = 1, \ldots N$$

where $w_{ij}$ is the weight. If $w_{ij}=0$ for all i and j that are more than 1-hop away, then only the 1-hop connectivity or distance measures are used. In some cases the information between 2-hop neighbors may also be helpful. In this case, $R_{ref}$ may be set to 2, and $w_{ij}=1$ when i and j are 1-hop away and $w_{ij}=\frac{1}{4}$ when they are two hops apart. The refinement improves the map by giving local information between neighbor nodes more weight, which is more accurate than the information between more distant nodes.

At 850 a linear transformation T of the nodes in I from their coordinates in M to those in M' is determined, such that the sum of squared errors between M and T(M') is minimized. There may be two options for T. One includes translation, reflection, and orthogonal rotation. The other includes scaling as well. M and related data are then updated through setting OPEN(M)=(OPEN(M)∪OPEN(M'))-(CLOSED(M)∪CLOSED(M'))
CLOSED(M)=CLOSED(M)∪CLOSED(M').

To obtain the coordinates of a node p in the new combined map M,

If p is in the old M but not in M', the coordinates in M are used;
If p is in M' but not in the old m, the coordinate in T(M') is used;
Otherwise, the average of p's coordinates in the old M and T(M') are used.

For the purposes of this discussion, relative maps are constructed irrespective of anchor nodes. However, if sufficient anchor nodes are known (three or more for two-dimensional networks, four or more for three-dimensional networks), at 850 the relative map is transformed to an absolute map based on the absolute positions of anchors. For those instances in which anchor nodes are present, using their positions in constructing the relative map may improve the accuracy of the maps, and such an approach is fully contemplated by the specification and scope of the claims herein.

The strength of the above embodiments is the ability to create relative maps when there are few or no anchor nodes available. Previous methods often required well-placed anchors to work well. For example, a constraint-based approach works well with anchors placed at the outside corners and edges and the constraints are tight, but it returns unsatisfactory results when the anchors are inside the network, close to the center. A collaborative multilateration approach also requires anchors throughout the network, as well as a relatively large number of anchors, to work well. The embodiments of the method disclosed herein do not have this limitation; they are capable of building relative maps of the nodes even without anchor nodes. With three or more anchor nodes, the relative maps can be transformed and absolute coordinates of the sensor nodes can be computed.

While the present discussion has been illustrated and described with reference to specific embodiments, further modification and improvements will occur to those skilled in the art. For example, alternate MDS techniques, such as ordinal MDS and MDS with missing data, may be applied, depending on the connectivity level of the sensor network. Additionally, adaptive setting of parameters will improve solution quality as well as speed. For example, in the distributed embodiments of the method herein, the best local map range depends on the connectivity and the structure of the local neighborhood and the errors of distance measures. For other applications that require absolute coordinates of nodes, the absolute coordinates of individual nodes may be computed independently. The transformations between the coordinate systems of neighboring nodes is found, the positions of three or more anchor nodes is propagated to each node's coordinate system using these transformations, and then the absolute coordinate of each node is derived. A "computer", as used herein, can mean any device which stores, processes, routes, manipulates, or performs like operation on data. It is to be understood, therefore, that this disclosure is not limited to the particular forms illustrated and that it is intended in the appended claims to embrace all alternatives, modifications, and variations which do not depart from the spirit and scope of the embodiments described herein.

What is claimed is:

1. A method for deriving node localization information within a distributed communication network, the distributed communication network comprising a plurality of sub-networks, each sub-network having a plurality of nodes, wherein said nodes are separated by paths, the method comprising:
   setting not less than one value for a local mapping range;
   computing local maps for each sub-network within the distributed communication network by:
      estimating the shortest path between a plurality of pairs of the nodes in the sub-network, constructing a matrix, wherein said matrix includes said estimated shortest paths, applying multidimensional scaling to said matrix and identifying the eigenvectors corresponding to the largest eigenvalues, and constructing a local map of the location of said plurality of pairs of nodes within the sub-network utilizing said eigenvectors;

merging the local maps for each sub-network to form a relative map for the distributed communication network; and transforming the distributed communication network relative map to an absolute map for the distributed communication network, wherein each of the sub-networks includes a local map having not less than one pair of the plurality of pairs of nodes within the distributed communication network.

2. The method for deriving node localization information according to claim 1, wherein computing said shortest paths comprises:

assigning estimated values to the initial edges in the graph; and applying an all-pairs shortest path algorithm.

3. The method for deriving node localization information according to claim 2, wherein edges are assigned a value of 1.

4. The method for deriving node localization information according to claim 2, wherein said shortest paths are estimated based on information such as ranging data, received signal strength, or other means.

5. The method for deriving node localization information according to claim 1, wherein said plurality of pairs of the nodes in each sub-network comprises all nodes in the sub-network.

6. The method for deriving node localization information according to claim 1, wherein said relative map comprises a two-dimensional map.

7. The method for deriving node localization information according to claim 1, wherein said relative map comprises a three-dimensional map.

8. The method for deriving node localization information according to claim 1, wherein said relative map includes anchor nodes.

9. The method for deriving node localization information according to claim 8, further comprising transforming said relative map to an absolute map based on the absolute position of said anchor nodes.

10. The method for deriving node localization information according to claim 9, wherein transforming said relative map to an absolute map comprises one or more of translation, reflection, orthogonal rotation, or scaling.

11. The method for deriving node localization information according to claim 8, wherein not fewer than three said anchor nodes are utilized to construct a two-dimensional relative map.

12. The method for deriving node localization information according to claim 8, wherein not less than four said anchor nodes are utilized to construct a three-dimensional relative map.

13. The method for deriving node localization information according to claim 9, further comprising refining said transformed relative map, wherein refining comprises causing distances between nodes within a specified refinement range to better match estimated or measured distances.

14. The method for deriving node localization information according to claim 13, wherein said refinement range is defined based on hops and specifies those nodal distances to be considered.

15. The method for deriving node localization information according to claim 1, wherein said local mapping range value varies for the sub-networks within said distributed network.

16. The method for deriving node localization information according to claim 1, wherein said local mapping range value is defined based on hops.

17. The method for deriving node localization information according to claim 1, wherein computing local maps for each sub-network within said distributed communication network comprises:

computing the shortest distance between all pairs in a sub-network node's local mapping range;

constructing a distance matrix for each said sub-network, wherein said distance matrix includes said shortest path distances;

applying multidimensional scaling to each said distance matrix and identifying the largest eigenvectors; and constructing said local map of the location of said plurality of pairs of nodes within each said sub-network utilizing said eigenvectors.

18. The method for deriving node localization information according to claim 1, wherein said local maps are merged either sequentially or in parallel.

19. The method for deriving node localization information according to claim 1, wherein said local maps are merged randomly.

20. The method for deriving node localization information according to claim 1, wherein said local maps are merged according to specified properties.

21. The method for deriving node localization information according to claim 1, wherein said local maps are merged by patching.

22. The method for deriving node localization information according to claim 21, wherein patching comprises:

randomly selecting a sub-network node, wherein said sub-network node includes an associated local map;

identifying said randomly selected sub-network node local map as the core map; and merging neighboring sub-network node local maps with said core map.

23. The method for deriving node localization information according to claim 21, wherein patching said sub-network local maps together comprises patching together not fewer than two of said sub-network local maps, wherein patching said not fewer than two of said sub-network local maps comprises:

selecting a first node within a sub-network having a first local map, wherein said first local map includes a plurality of said pairs of nodes;

selecting a second sub-network having a second local map, wherein said second sub-network local map includes a plurality of said pairs of nodes and wherein said first local map and said second local map include a maximum number of common nodes;

merging said first local map and said second local map to form a first patched map;

selecting a next node from said first patched local map;

selecting a different sub-network having a different local map, wherein said different local map includes a plurality of said pairs of nodes and wherein said first patched local map and said different local map include a maximum number of common nodes;

merging said first patched local map and said different local map to form a second patched map; and repeating selecting a next node, selecting a different sub-network, and merging said patched local map and said different local map until all network nodes are included in a final patched global map.

24. The method for deriving node localization information according to claim 1, wherein transforming said distributed network relative map comprises not less than one of translation, reflection, orthogonal rotation, or scaling.

25. The method for deriving node localization information according to claim 1, further comprising refining said relative map for said distributed network.

26. The method for deriving node localization information according to claim 24, wherein refining said relative map for said distributed network comprises causing the computed distances between neighbor nodes to match measured distances between said neighbor nodes.

27. An article of manufacture comprising a computer usable recording medium having computer readable program code embodied in said recording medium which, when said program code is executed by said computer causes said computer to perform method steps for deriving node localization information within a communication network, the communication network comprising a plurality of sub-networks, each sub-network having a plurality of nodes, wherein the nodes are separated by paths, the method comprising:

setting not less than one value for a local mapping range;
computing local maps for each sub-network within the distributed communication network by:
    estimating the shortest path between a plurality of pairs of the nodes in the sub-network;
    constructing a matrix, wherein said matrix includes said estimated shortest paths,
    applying multidimensional scaling to said matrix and identifying the eigenvectors corresponding to the largest eigenvalues, and
    constructing a local map of the location of the plurality of pairs of nodes within the sub-network utilizing said eigenvectors;
merging said local maps for each sub-network to form a relative map for the distributed communication network; and
transforming the distributed communication network relative map to an absolute map for the distributed communication network,
wherein each of the sub-networks includes a local map having not less than one pair of the plurality of pairs of nodes within the distributed communication network.

\* \* \* \* \*

UNITED STATES PATENT AND TRADEMARK OFFICE
CERTIFICATE OF CORRECTION

PATENT NO.         : 7,457,860 B2
APPLICATION NO. : 10/682754
DATED                 : November 25, 2008
INVENTOR(S)      : Yi Shang and Wheeler Ruml It is certified that error appears in the above-identified patent and that said Letters Patent is hereby corrected as shown below:

On the title page, please correct the Assignee name as follows:

(73)    Palo Alto Research Center Incorporated, Palo Alto, CA (US)

Signed and Sealed this

Twentieth Day of January, 2009

JON W. DUDAS
*Director of the United States Patent and Trademark Office*